UNITED STATES PATENT OFFICE.

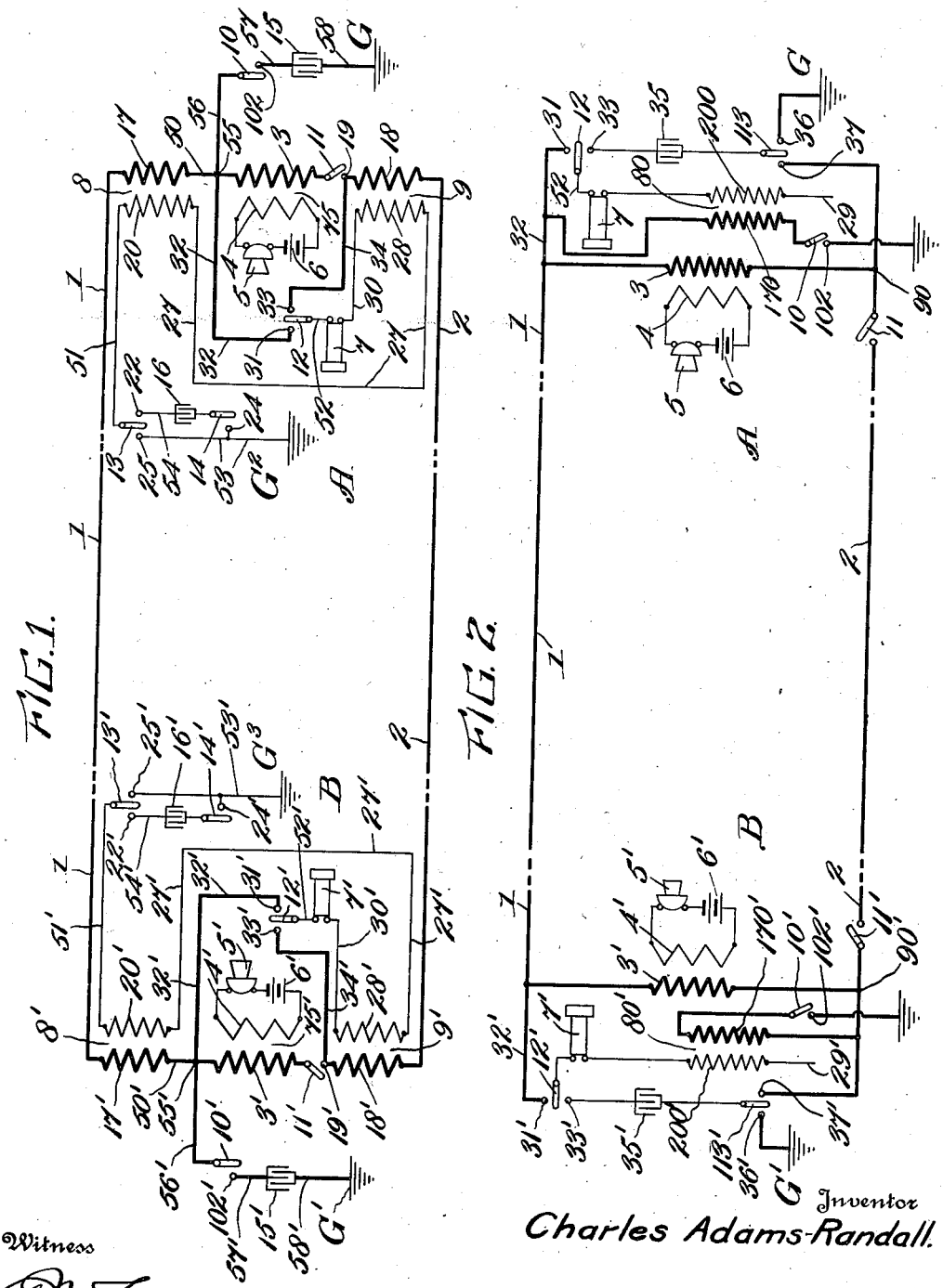

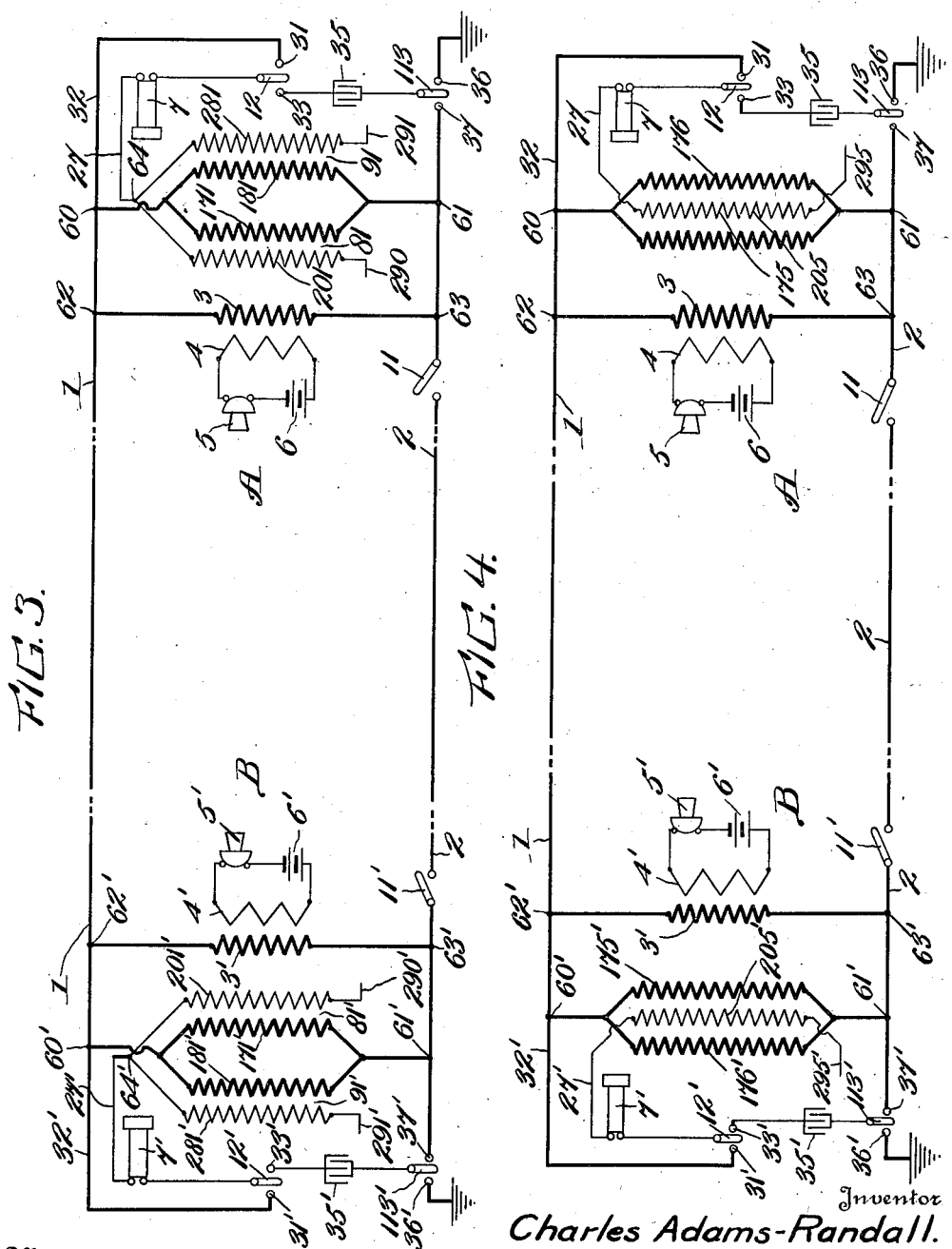

CHARLES ADAMS-RANDALL, OF BOSTON, MASSACHUSETTS.

TELEPHONE SYSTEM.

1,217,548.  Specification of Letters Patent.  Patented Feb. 27, 1917.

Application filed December 6, 1915. Serial No. 65,354.

*To all whom it may concern:*

Be it known that I, CHARLES ADAMS-RANDALL, a citizen of the United States, residing at Boston, in the county of Suffolk and State of Massachusetts, have invented certain new and useful Improvements in Telephone Systems; and I do hereby declare the following to be a full, clear, and exact description of the invention, such as will enable others skilled in the art to which it appertains to make and use the same.

This invention relates to telephone transmitting and receiving apparatus and has for its object to provide means of this character which will be comparatively inexpensive to manufacture and more efficient in action than those heretofore proposed.

With these and other objects in view, the invention consists in the novel parts and combinations of parts more fully hereinafter described and particularly pointed out in the claims.

Referring to the accompanying drawings forming a part of this specification in which like numerals designate like parts in all the views:—

Figure 1 is a diagrammatic view illustrating one arrangement of apparatus and circuits.

Fig. 2 is a diagrammatic view showing a somewhat modified arrangement of circuits.

Fig. 3 is a diagrammatic view showing a still further modified form of circuits; and Fig. 4 is a diagrammatic view similar to Fig. 3, showing the use of a modified form of compound coil.

Referring more especially to Fig. 1, the numeral 1 indicates a wire of a suitable main line circuit between two stations A and B, while 2 is the other, or return wire of said circuit. The apparatus and circuits of the two stations A and B being similar in every respect they will be described in detail only with respect to station A.

The secondary winding 3 of a suitable induction coil 75 is included in the said main line circuit while its primary 4, together with a suitable transmitter 5 and a battery 6, are joined in the usual local circuit.

8 and 9 denote special or compound coils whose respective windings 17 and 20 18 and 28 are composed of independent conductors simultaneously wound upon suitable cores. These coils differ from induction and transformer coils in that at least one end of one of the windings is open or disconnected from any circuit.

The winding 17 of the compound coil 8 is joined in series with one end of the secondary 3 of the induction coil 75 by the wire 50 while the winding 18 of the compound coil 9 is connected in series with the other end of said secondary 3 through a suitable switch 11. One end of the winding 20 of the compound coil 8 is connected by a wire 51 to a switch 13 for a purpose to be more fully disclosed below, while the other end of the winding 20 is joined by a wire 27 to one end of the winding 28 of the compound coil 9. The other end of the winding 28 is joined by a wire 30 to one terminal of a suitable telephone receiver 7 whose other terminal is joined by a wire 52 to a switch 12. The switch 12 is adapted to make contact either with the contact point 31 joined by wire 32 to the wire 50 as at 55, or it may make contact with the contact point 33 which is joined by wire 34 to contact 19 of switch 11, all as will be clear from the drawings. The switch 13 may make contact with the contact 25, grounded as at $G^2$ by the wire 53, or the said switch may contact with point 22 connected by wire 54 through condenser 16 to switch 14 and wire 53, as shown.

Joined to the wire 50, as at 55, is a wire 56 leading to a switch 10 adapted to make contact with a contact point 102, joined by a wire 57 to one side of a suitable condenser 15 whose other side is grounded as at G by a wire 58.

As above stated, the parts just disclosed are duplicated at the other end, B, of the main line 1, 2; and they are designated by corresponding numerals having a prime exponent in each case.

The parts being arranged as disclosed, the operation is as follows:—

Supposing the switches 11 and 11' to be closed or making contact with the contact points 19 and 19', respectively, if speech is uttered into the transmitter 5, the current from battery 6 in the primary 4 will be varied in the well known manner. These variations of current will induce corresponding currents in the secondary 3 of the induction coil 75 and these induced currents may be said to travel from said secondary 3 along wire 50, winding 17 of compound coil 8, main line wire 1, winding 17' of coil 8', wire 50', secondary 3', switch 11', winding 18' of coil 9', main line wire 2, winding 18 of compound coil 9 and switch 11 back to the secondary 3, over an entirely closed metallic circuit.

The switches 13′ and 12′ being open, the induced currents traversing the windings 17′ and 18′ will charge the companion windings 20′ and 28′ respectively, and speech will thereby be reproduced in the receiver 7′ with great clearness under normal conditions.

When, however, speech is not clearly reproduced, at the receiver 7′, by manipulating one or more of the switches 13′, 12′ or 10′, the clearness of the received speech will be at once reëstablished. In some cases, the conditions of the line are such that the received speech is improved by opening the switch 11 at the sending station A, while at other times the conditions will improve if switch 11′ at station B is opened. Under still other conditions, I have attained greatly improved results by grounding the secondaries 3 and 3′ through the condensers 15 and 15′ by closing the switches 10 and 10′ respectively.

In the modified form of the invention shown in Fig. 2, instead of employing two compound coils such as 8 and 9 at each station, I only employ a single compound coil such as 80 or 80′ at each station, said coils having the ends 29 and 29′ of the windings 200 and 200′ open to the atmosphere as shown.

A further difference in Fig. 2 from the structure shown in Fig. 1, resides in the fact that the winding 170 of the compound coil 80 is not joined in series with the winding or secondary 3, as is the winding 17 or 18 in Fig. 1. Further the condenser 35 is provided and grounded through the switch 113.

In operation voice caused currents in this modified form of the invention will traverse the main line 1, 2 as above disclosed, and when the switches 11′ and 11 are closed, they will divide so to speak at the point 90, a portion of the same flowing into the coil 170′ to charge the same. These charging currents will correspondingly charge the coil 200′ and cause the speech to be reproduced with great clearness in the receiver 7′. When the switches 11′ or 11 are open the same action occurs, except the charging currents in the coil 170′ are somewhat stronger.

In the further modified form of the invention shown in Fig. 3, two compound coils, such as 81, 91 are again used at each of the stations A and B. The windings 171 and 181 of these coils are joined in multiple and shunted across the main line circuit as at 60 and 61, while the windings 201 and 281 are joined at one end as at 64, their other ends being left open or physically disconnected as at 290 and 291, respectively.

The operation of this form of the invention is substantially the same as in the case of Fig. 2. That is to say, voice caused currents starting from secondary 3 may be said to traverse the main line 1 and divide at 62′, part of them returning by way of secondary 3′, switch 11′, main line 2 and switch 11 to secondary 3, while the remaining currents traverse the windings 171′ and 181′ charging them. These charging currents will charge the windings 201 and 281 and cause the speech to be reproduced in receiver 7, as described in connection with Fig. 2.

Fig. 4 shows the use of a modified form of compound coil in which three wires or conductors are simultaneously wound upon a suitable core. In this case two of the windings such as 175 and 176 are connected in multiple and shunted across the main line 1, 2, as at 60, 61. The third winding 205 is left open or physically disconnected at one end, such as 295, while the other end is joined in the local circuit with the receiver 7 by the wire 27, as was the case in Fig. 3.

The connections being substantially the same as shown in Fig. 3, the operation is likewise substantially the same as disclosed above in connection with said figure.

In all the forms it will be observed that I employ one or more compound coils associated with one induction coil at each distant station on the line and that I also employ one or more condensers, ground connections and switches at each of said stations. It will be further observed that I can so manipulate the switches as to include a complete metallic circuit in all cases between the stations, or I can break said circuit and charge the receiver coils at the distant station over a broken circuit, while connecting the receiver to ground through a condenser, or not, as may be desired.

What I claim is:—

1. In a telephonic circuit the combination of a transmitter and local circuit at the sending station; a secondary coil inductively connected with said local circuit; a metallic main line circuit provided with means to break the same leading to a receiving station; a compound coil joined to said main line at the receiving station; a receiver at said last-named station having one end of its coil connected to one end of one of the members of said compound coil, the other end of the receiver coil, and the other end of the said compound coil member being open to the atmosphere; and a ground connection located at said receiving station to which said open end of the receiver coil may be joined at will, substantially as described.

2. In a telephone circuit the combination of a transmitter and local circuit at the sending station; a secondary coil inductively connected with said local circuit; a metallic main line circuit provided with means to break the same, leading to a receiving station; a plurality of compound coils joined to said main line at the receiving station; a receiver provided with a coil located at said receiving station; a local receiving circuit connecting one end of said receiver coil with one member of each of said compound coils, the other end of said receiver coil being open to the atmosphere; and means for grounding said open end at will, substantially as described.

3. In a telephone circuit the combination of a transmitter and local circuit at the sending station; a secondary coil inductively connected with said local circuit; a metallic main line circuit provided with means for breaking the same at will leading to a receiving station; a plurality of compound coils at said receiving station, each having one of its windings joined in said main line circuit in series; a local receiving circuit having both its ends normally open to the atmosphere; a receiver connected in said local receiving circuit in series with the other windings of said compound coils; and means for grounding either and both ends of said local receiving circuit at will, substantially as described.

4. In a system of telephonic transmission the combination of a main line circuit; a local transmitting circuit, including a transmitter and battery, inductively connected with said main line circuit; a local receiving circuit including a telephone receiver; means in said local receiving circuit for connecting one of the terminals of said receiver to said main line at different points; a ground connection; and means for joining the other terminal of said receiver to said ground connection at will, substantially as described.

5. In a system of telephonic transmission the combination of a main line circuit; a local transmitting circuit, inductively connected to said main line circuit; a local receiving circuit including a receiver; means for joining one terminal of said receiver to said main line circuit; a ground connection; means for connecting said main line and receiver terminal to said ground connection; a second ground connection; and means for joining the other terminal of said receiver to said second ground connection at will, substantially as described.

In testimony whereof I affix my signature, in presence of two witnesses.

CHARLES ADAMS-RANDALL.

Witnesses:
 Jas. J. O'Connor,
 Chas. C. Dasey.